United States Patent
Lange et al.

(10) Patent No.: US 11,821,252 B2
(45) Date of Patent: Nov. 21, 2023

(54) DRIVE DEVICE FOR A WINDOW LIFTER HAVING A GEAR COVER

(71) Applicant: Brose Fahrzeugteile SE & Co. Kommanditgesellschaft, Bamberg, Bamberg (DE)

(72) Inventors: Gabriele Lange, Marktrodach (DE); Roland Kalb, Rossach (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 185 days.

(21) Appl. No.: 17/425,436

(22) PCT Filed: Jan. 23, 2020

(86) PCT No.: PCT/EP2020/051607
§ 371 (c)(1),
(2) Date: Jul. 23, 2021

(87) PCT Pub. No.: WO2020/152259
PCT Pub. Date: Jul. 30, 2020

(65) Prior Publication Data
US 2022/0098917 A1    Mar. 31, 2022

(30) Foreign Application Priority Data
Jan. 24, 2019  (DE) .................. 10 2019 200 890.9

(51) Int. Cl.
*E05F 15/697* (2015.01)
*F16H 19/06* (2006.01)
(Continued)

(52) U.S. Cl.
CPC ........... *E05F 15/697* (2015.01); *F16H 19/06* (2013.01); *F16H 57/029* (2013.01);
(Continued)

(58) Field of Classification Search
CPC ..... E05F 15/697; F16H 57/031; F16H 57/039
See application file for complete search history.

(56) References Cited

U.S. PATENT DOCUMENTS 5,836,219 A * 11/1998 Klingler ................ E05F 15/697
74/606 R
7,950,185 B2 * 5/2011 Lefevre ................. E05F 11/486
49/502

(Continued)

FOREIGN PATENT DOCUMENTS

DE    102004044863 A1    3/2006
DE    102016216880 A1    3/2018
(Continued)

*Primary Examiner* — Jake Cook
(74) *Attorney, Agent, or Firm* — Dickinson Wright PLLC

(57) ABSTRACT

A drive device for use in an adjusting apparatus configured to adjust a vehicle part, including a drive housing provided with a housing pot, a drive gear disposed in the housing pot and rotatable about an axis of rotation, an output element operatively connected to the drive gear, and a gear cover, connected to the housing pot and annularly extending about the axis of rotation, and including a cover body provided with a first edge portion connected to the housing pot and a second edge portion protruding radially inwards relative to the first edge portion. A height measured axially between the first edge portion and the second edge portion varies with respect to a circumferential direction about the axis of rotation.

19 Claims, 11 Drawing Sheets

(51) Int. Cl.
*F16H 57/029* (2012.01)
*F16H 57/031* (2012.01)
*F16H 57/039* (2012.01)
*F16H 57/02* (2012.01)
*F16H 57/032* (2012.01)

(52) U.S. Cl.
CPC ......... *F16H 57/031* (2013.01); *F16H 57/039* (2013.01); *E05Y 2201/10* (2013.01); *E05Y 2800/12* (2013.01); *E05Y 2900/55* (2013.01); *F16H 2019/0681* (2013.01); *F16H 2057/02034* (2013.01); *F16H 2057/02082* (2013.01); *F16H 2057/0325* (2013.01)

(56) References Cited

U.S. PATENT DOCUMENTS

| | | | |
|---|---|---|---|
| 10,415,705 B2* | 9/2019 | Murai | F16J 15/062 |
| 2016/0036287 A1* | 2/2016 | Hazel | E05F 15/697 |
| | | | 310/83 |

FOREIGN PATENT DOCUMENTS

| | | |
|---|---|---|
| DE | 102017214612 A1 | 3/2018 |
| GB | 708307 A | 5/1954 |

* cited by examiner

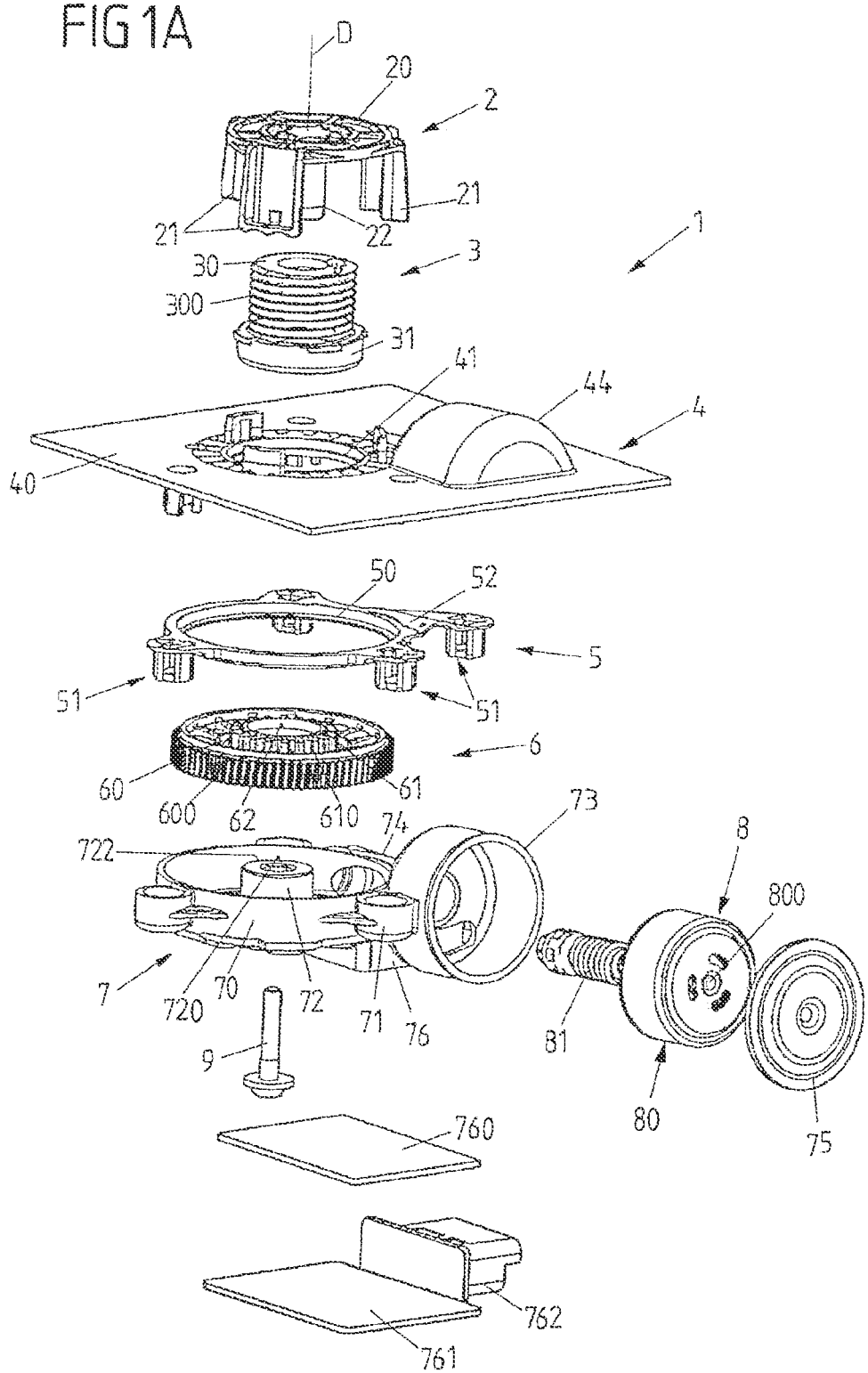

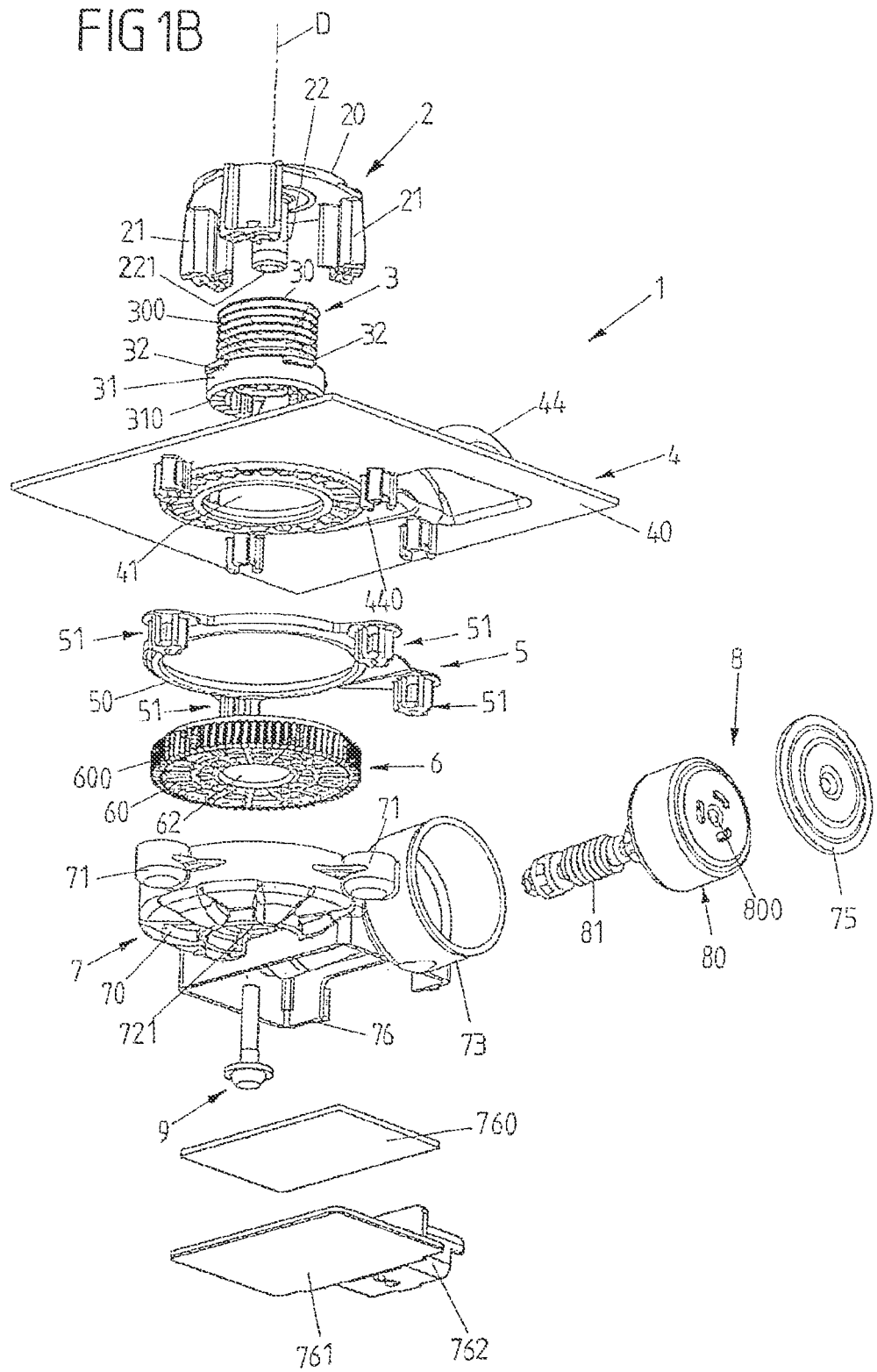

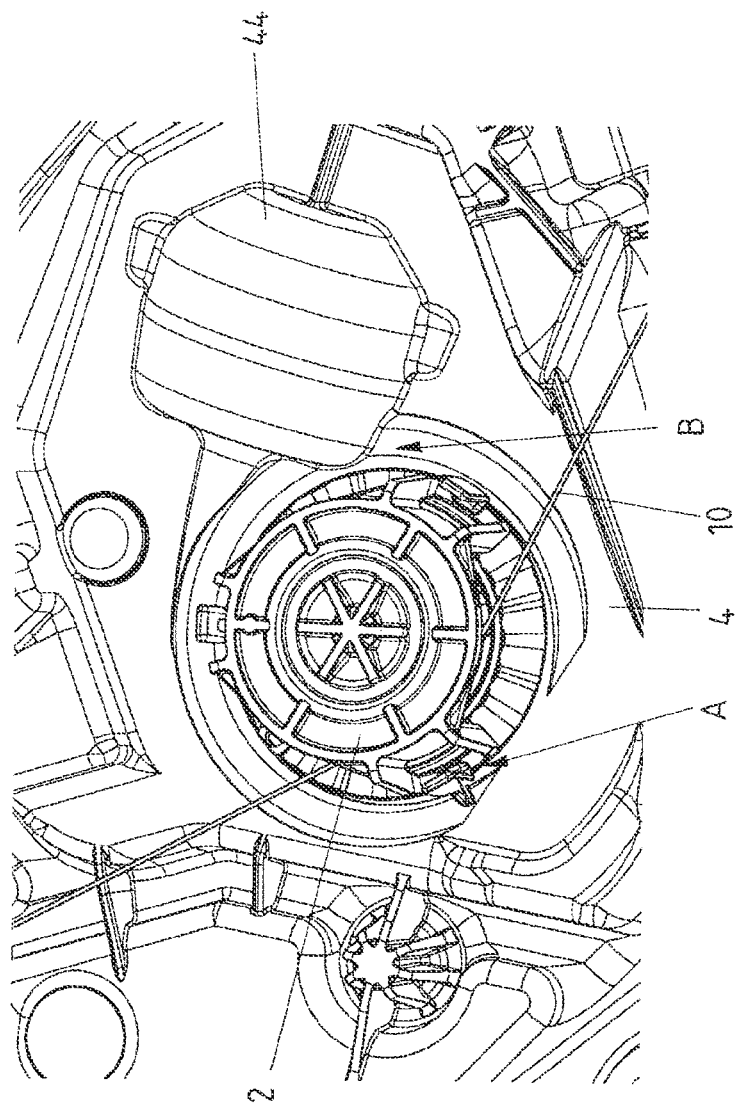

DRIVE DEVICE FOR A WINDOW LIFTER HAVING A GEAR COVER

CROSS-REFERENCE TO RELATED APPLICATIONS

This application is the U.S. National Phase of PCT Application No. PCT/EP2020/051607 filed on Jan. 23, 2020, which claims priority to German Patent Application No. DE 10 2019 200 890.9, filed on Jan. 24, 2019, the disclosures of which are hereby incorporated in their entirety by reference herein.

TECHNICAL FIELD

This present disclosure relates to a drive device for an adjusting apparatus for adjusting a vehicle part, such as a window lifter.

BACKGROUND

A drive device for an adjusting apparatus for adjusting a vehicle part, such as a window lifter, may include a drive housing which includes a housing pot, a drive gear accommodated in the housing pot so as to be rotatable about an axis of rotation, an output element operatively connected to the drive gear, and a gear cover connected to the housing pot and annularly extending about the axis of rotation, which includes a cover body that has a first edge portion connected to the housing pot and a second edge portion protruding radially inwards relative to the first edge portion.

Such a drive device may be part of a window lifter device and thus can be used for adjusting a window pane. However, such a drive device can also be used for adjusting another adjustment element, for example a sliding roof or the like, in a vehicle.

In a window lifter, one or more guide rails can be arranged for example on an assembly carrier of a door module, on each of which a carrier coupled with a window pane is guided. The carrier is coupled with the drive device via a slack traction element (e.g. a traction cable) designed for the transmission of (exclusively) tensile forces, wherein the traction element is arranged on the cable drum in such a way that during a rotary movement of the cable drum the traction element is wound up on the cable drum with one end and is unwound from the cable drum with another end. Thus, a cable loop formed by the traction cable is shifted, and the carrier correspondingly is moved along the respectively associated guide rail. Driven by the drive device, the window pane can be adjusted to for example clear or close a window opening on a vehicle side door.

SUMMARY

One or more objects of the present invention may be to provide a drive device for an adjusting apparatus for adjusting a vehicle part, such as a window lifter, which may provide for a compact, space-saving construction, when using a gear cover possibly suitable for a sealing function relative to the drive gear.

Accordingly, a height measured axially between the first edge portion and the second edge portion varies when viewed along a circumferential direction about the axis of rotation.

The gear cover may include a cover body which is connected, for example welded, to the housing pot with a first edge portion. Via the first edge portion, the cover body of the gear cover thus rests against a wall portion associated to the housing pot so that the gear cover is held in position at the housing part via the first edge portion. The second edge portion, on the other hand, protrudes radially inwards from the first edge portion and thus extends radially towards the axis of rotation about which the drive gear is rotatably accommodated in the housing pot. The cover body of the gear cover thus sectionally overlaps the drive gear with the second edge portion so that via the radially inner, second edge portion, for example, the drive gear is enclosed in the housing pot through the gear cover.

The first edge portion does not have a constant height relative to the second edge portion, but has a varying height—viewed in the circumferential direction about the axis of rotation. For example, the second edge portion can extend annularly about the axis of rotation along a plane directed perpendicularly to the axis of rotation and thus is aligned parallel to the drive gear rotatably accommodated in the housing pot. The second edge portion here faces the drive gear and for example can carry a sealing element via which a sealing is provided between the gear cover and the drive gear. The first edge portion of the gear cover here does not extend at a constant height relative to the second edge portion, but has a varying height relative to the second edge portion.

For example, the first edge portion in one embodiment can extend along a plane directly obliquely to the axis of rotation. The first edge portion here for example extends annularly about the axis of rotation, but is aligned obliquely to the axis of rotation and thus has a varying height relative to the second edge portion.

In another embodiment, the first edge portion can have different sections which are located at a different height relative to the second edge portion. Thus, a first section of the first edge portion can be arranged at a first height, while a second section of the first edge portion is located at a second height. Here, the first height and the second height differ from each other so that the different sections of the first edge portion have different heights relative to the second edge portion, each measured axially along the axis of rotation.

Due to the fact that the first edge portion and the second edge portion do not extend parallel to each other, but the height between the first edge portion and the second edge portion, viewed in a circumferential direction about the axis of rotation, varies, it becomes possible to provide a drive device of compact design with an installation space requirement that is reduced such as axially reduced along the axis of rotation. The drive housing for example can have a housing portion which encloses a transmission element, for example a drive worm, that is operatively connected to the drive gear. In the area of such a housing portion, a comparatively large height can be required between the first edge portion and the second edge portion in order to be able to produce a welding connection between the gear cover and the drive housing. In the area of such a housing portion, a material thickening can be provided for example in order to connect the gear cover to the housing portion enclosing the transmission element, so that via such a material thickening for example a welding connection can be produced by using laser welding or ultrasonic welding. In other sections of the drive housing, however, a reduced height between the first edge portion and the second edge portion can be sufficient. In such areas of the drive housing, the height between the first edge portion and the second edge portion of the gear cover thus can be chosen small, so that in areas where the gear cover does not need to have a large height, the gear cover is configured with a small axial installation space and thus does not unnecessarily contribute to the axial installation space of the drive device.

This can involve the further advantage that in areas in which the height between the first edge portion and the second edge portion of the gear cover is small, more installation space can be provided in an axial direction for other functional components, for example for a power transmission means configured for instance as a traction cable, which is operatively connected to the output element and for power transmission extends from the output element to a vehicle part to be driven.

The varying height can be created by the oblique positioning of the first edge portion. In this case, the first edge portion thus extends annularly along a plane directed obliquely to the axis of rotation. Alternatively, the first edge portion can have different sections which as such each extend parallel to the second edge portion, but are located at different heights relative to the second edge portion, so that a raised section of the first edge portion can be provided, for example, at a point where the gear cover is to be connected for example to a housing portion enclosing a transmission element for driving a drive gear.

Via the first edge portion, the gear cover can be circumferentially connected to the drive housing, in particular to a wall portion of the housing pot, wherein the connection between the gear cover and the drive housing is circumferentially produced via a welding connection, for example by means of laser welding or ultrasonic welding. As an example, in the area of a section of the first edge portion which is raised relative to the second, radially inner edge portion, a material thickening can be provided on the drive housing, in particular in the area of a housing portion which encloses a transmission element for driving the drive gear, in order to be able to produce a welding connection in the area of such a housing portion.

In one or more embodiments, the gear cover includes a sealing element arranged on the cover body for sealing a transition to the drive gear. The sealing element may be connected to the second edge portion and for example protrudes radially inwards from the second edge portion of the cover body or axially along the axis of rotation in the direction of the drive gear. Via the sealing element a seal may be created between the gear cover and the drive gear so that when the drive gear is rotated, the sealing element slides on the drive gear, but in doing so sealingly rests against the drive gear.

The sealing element for example can be integrally connected to the cover body by means of two-component plastic injection molding. In this case, the sealing element is formed of a soft material, such as an elastomeric plastic material, integrally with the cover body of the gear cover, wherein the cover body can be fabricated for example from a comparatively hard plastic material. Alternatively, the sealing element can also be fabricated as a separate element from a suitable soft material, such as an elastomeric plastic, and for example be attached to the cover body by creating a positive connection.

In one embodiment, the drive gear may include a rotational body and a collar axially protruding from the rotational body along the axis of rotation. The drive gear can be configured as a spur gear, wherein in this case a spur gear toothing is formed on the rotational body on a circumferential outer shell surface. The collar protrudes from the rotational body, with which collar a sealing element arranged on the cover body of the gear cover and for example protruding radially inwards from the cover body sealingly cooperates to provide a moisture-tight seal.

The drive device for example can include a motor unit comprising an electric motor. The electric motor comprises a stator, a rotor rotatable relative to the stator and a rotatable drive shaft to be driven by the electric motor. The drive shaft can carry for example a drive worm having a worm toothing. Via the drive worm, the drive shaft can be in gear connection with a drive gear of the gear stage, so that the drive wheel can be driven by a rotary movement of the drive shaft.

The drive device for example can be part of a cable drive, in which a cable drum is operatively connected to the drive gear. Thus, the cable drum is driven via the drive gear so that a traction element arranged on the cable drum, for example a traction cable, is moved and the vehicle part to be adjusted by means of the drive device is adjusted thereby. Such a cable drive for example can be part of a window lifter device or also of a sliding roof drive or a tailgate drive.

An assembly for example of a vehicle door may include a drive device as described above as well as a carrier element, for example of a door module, to which the drive device is connected. The drive housing of the drive device together with the drive gear enclosed in the motor pot and the housing cover connected to the motor pot can be arranged on a first side of the carrier element, which for example faces a dry space of a vehicle door. The output element, for example in the form of a cable drum, here can be arranged on a second side of the carrier element so that the output element and the drive housing are located on different sides of the carrier element. The output element can be operatively connected to the drive gear through an opening in the carrier element, wherein a transition between the first side of the carrier element and the second side of the carrier element is sealed for example by means of a sealing element arranged on the gear cover so that moisture cannot easily get from the second side of the carrier element, which for example is associated to a wet space of a vehicle door, into the area of the first side of the carrier element.

BRIEF DESCRIPTION OF THE DRAWINGS

The idea underlying the invention will be explained in detail below with reference to the exemplary embodiments illustrated in the Figures. In the drawing:

FIG. 1A shows an exploded view of an exemplary embodiment of a drive device;

FIG. 1B shows the exploded view of FIG. 1A, from another perspective;

FIG. 17 shows a view of a cable outlet housing on a side of a carrier element facing away from the drive housing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a drive for an adjusting apparatus in a motor vehicle, which is known from DE 10 2004 044 863 A1, a cable drum is arranged on a bearing dome of a drive housing, wherein the drive housing is connected to a carrier element in the form of an assembly carrier via a fastening element in the form of a screw.

A drive device for a window lifter, which for example is to be mounted on a carrier element in the form of an assembly carrier of a door module on a vehicle side door, and thus is to be enclosed within a vehicle side door, will have advantageous operating properties, in particular a smooth-running behavior with low vibration excitation on the carrier element, and also will efficiently utilize the available installation space. There is a need to provide the drive device with a compact design, wherein the drive device however must provide a sufficient torque in order to ensure a reliable adjustment of the adjustment part to be adjusted, for example of the window pane.

In such a drive device, a gear cover serves to at least sectionally delimit an interior space of the housing pot in such a way that the drive gear is enclosed in the housing pot with the participation of the gear cover. Via such a gear cover, a sealing can be provided with respect to the drive gear rotatably accommodated in the housing pot, so that moisture cannot get into the area of the drive gear and of a drive motor operatively connected to the drive element from outside, in particular from the area of the output element configured as a cable drum.

FIGS. 1A, 1B show an exemplary embodiment of a drive device 1 which for example can be used as a drive in an adjusting apparatus for adjusting a window pane for example of a vehicle side door.

Figure 2:
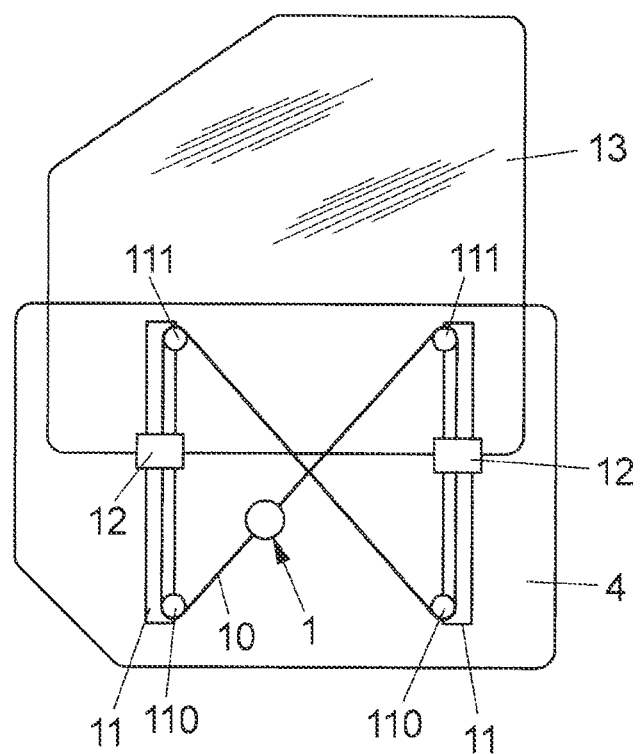
FIG. 2 shows a schematic view of a window lifter device.

Such an adjusting apparatus in the form of a window lifter, shown in FIG. 2 by way of example, for instance includes a pair of guide rails 11 on each of which a carrier 12, which is coupled to a window pane 13, can be adjusted. Each carrier 12 is coupled to a drive device 1 via a power transmission element in the form of a traction cable 10, which is configured for the transmission of (exclusively) tensile forces, wherein the traction cable 10 forms a closed cable loop and with its ends therefor is connected to an output element in the form of a cable drum 3 (see for example FIGS. 1A and 1B) of the drive device 1. The traction cable 10 extends from the drive device 1 around deflection pulleys 110 at the lower ends of the guide rails 11 towards the carriers 12 and from the carriers 12 around deflection pulleys 111 at the upper ends of the guide rails 11 back to the drive device 1.

In operation, a motor unit of the drive device 1 drives the cable drum 3 in such a way that the traction cable 10 is wound up onto the cable drum 3 with one end and is unwound from the cable drum 3 with the other end. As a result, the cable loop formed by the traction cable 10 is shifted without changing the freely extended cable length, which leads to the fact that the carrier 12 moves on the guide rails 11 in the same direction and the window pane 13 thereby is adjusted along the guide rails 11.

In the exemplary embodiment of FIG. 2, the window lifter is arranged on an assembly carrier 4 of a door module. The assembly carrier 4 for example can be fixed to a door inner panel of a vehicle door and constitutes a premounted unit, which in the premounted state can be mounted on the vehicle door with the window lifter arranged on the assembly carrier 4.

The drive device 1 of the exemplary embodiment of FIGS. 1A, 1B is arranged on a surface portion 40 of a carrier element 4 realized for example by an assembly carrier of a door module and includes a cable outlet housing 2 arranged on a first side of the carrier element 4 and a drive housing 7 arranged on a second side of the carrier element 4 facing away from the first side. The cable outlet housing 2 serves to mount the cable drum 3 on the carrier element 4, while the drive housing 7 among other things encloses a drive gear 6 which can be driven via a motor unit 8 and is connected to the cable drum 3 so that the cable drum 3 can be driven by rotating the drive gear 6.

When properly arranged for example on a vehicle door of a vehicle, the cable drum 3 on the first side of the carrier element 4 is arranged in a wet space of the vehicle door. The drive housing 7 on the other hand is located in the dry space of the vehicle door. The separation between wet space and dry space is produced by the carrier element 4, and the interface between the drive gear 6 and the cable drum 3 correspondingly is to be sealed in a moisture-tight way so that no moisture can get from the wet space into the dry space.

The cable outlet housing 2 has a bottom 20, a cylindrical bearing element 22 in the form of a bearing dome centrally protruding from the bottom 20, and housing portions 21 in the form of housing webs extending parallel to the cylindrical bearing element 22, which are radially spaced from the bearing element 22. The cable drum 3 is rotatably mounted on the bearing element 22 and enclosed by the cable outlet housing 2 in such a way that the cable drum 3 is held on the carrier element 4.

The cable drum 3 has a body 30 and, on the circumferential shell surface of the body 30, a cable groove 300 formed in the body 30 for accommodating the traction cable 10. With an internal gear 31, the cable drum 3 is inserted into an opening 41 of the carrier element 4 and is non-rotatably connected to the drive gear 6 so that a rotary movement of the drive gear 6 leads to a rotary movement of the cable drum 3.

The drive housing 7 is attached to another, second side of the carrier element 4 and includes a housing pot 70 with a bearing element 72 centrally formed therein in the form of a cylindrical bearing dome, which reaches through an opening 62 of the drive gear 6 and in this way rotatably supports the drive gear 6. The housing pot 70 is adjoined by a worm housing 74 with a drive worm 81 resting therein, which is non-rotatably connected to a drive shaft 800 of an electric motor 80 of the motor unit 8 and via a worm toothing is in meshing engagement with an external toothing 600 of a rotational body 60 of the drive gear 6. The drive shaft 800 is mounted in the worm housing 74 via a bearing at its end facing away from the electric motor 80. The electric motor 80 rests in a motor pot 73 of the drive housing 7, which is closed towards the outside via a housing cover 75.

The drive housing 7 also includes an electronics housing 76 in which a circuit board 760 with an electronic control unit arranged thereon is enclosed. The electronics housing 76 is closed towards the outside via a housing plate 761 with a connector 762 arranged thereon for electrically connecting the electronics of the circuit board 760.

The drive gear 6 includes a connecting gear 61, axially protruding from the rotational body 60, with an external toothing 610 formed thereon, which is in engagement with the internal gear 31 of the cable drum 3 in such a way that an internal toothing 310 of the internal gear 31 (see for example FIG. 1B) is in meshing engagement with the external toothing 610 of the connecting gear 61. In this way, the drive gear 6 and the cable drum 3 are non-rotatably connected to each other so that the cable drum 3 can be rotated by driving the drive gear 6 on the carrier element 4.

For mounting the drive device 1, the cable outlet housing 2 on the one hand is attached to the carrier element 4 and the drive housing 7 on the other hand is attached to the carrier element 4. The attachment to the carrier element 4 then is effected by inserting a fastening element 9 in the form of a screw element into an engagement opening 721 on the bottom side of the drive housing 7 in such a way that the fastening element 9 extends through an opening 720 in the bearing element 72 of the drive housing 7 and centrally engages into an opening 221 within the bearing element 22 of the cable outlet housing 2. Via the fastening element 9, the cable outlet housing 2 and the drive housing 7 are axially braced relative to each other on the bearing elements 22, 72 and thereby fixed to the carrier element 4.

For assembly, the cable outlet housing 2 is attached to the first side of the carrier element 4 so that the cable outlet housing 2 encloses the cable drum 3 and holds it on the carrier element 4. The drive housing 7 on the other hand is attached to the other, second side of the carrier element 4 in such a way that the motor pot 73 comes to lie in a recess 44 in the surface portion 40 and the worm housing 74 comes to lie in an adjoining recess 440 in the surface portion 40. During assembly, the internal gear 31 formed on the output element in the form of the cable drum 3 is operatively connected to the connecting gear 61 of the drive gear 6 so that the cable drum 3 is non-rotatably connected to the drive gear 6 and thus in operation a rotary movement of the drive gear 6 is transmitted to the cable drum 3. The cable drum 3 with the internal gear 31 here engages into the opening 41 of the carrier element 4 so that the internal gear 31 reaches through the carrier element 4 in order to produce an operative connection between the output element in the form of the cable drum 3 on the first side of the carrier element 4 associated to a wet space of the vehicle door and the drive gear 6 on the second side of the carrier element 4 associated to the dry space.

As is shown in a first exemplary embodiment in FIGS. 3 to 9, the drive housing 7 is connected to a gear cover 5 which at least sectionally delimits an interior space of the housing pot 70, in which the drive gear 6 is rotatably accommodated, and extends circumferentially about the axis of rotation D on the housing pot 70. The gear cover 5 may provide a moisture-tight transition to the drive gear 6 so that moisture cannot get from the area of the wet space of the vehicle door via the drive gear 6 into the area of the motor unit 8 and the electronics enclosed in the electronics housing 76.

The gear cover 5 has a cover body 50 which is connected, such as welded to a circumferential wall portion of the motor pot 70 via a first, annular edge portion 502 circumferentially extending about the axis of rotation D. A second edge portion 500 protrudes radially inwards from this first edge portion 502, which likewise annularly extends about the axis of rotation D and is connected to the first edge portion 502 via an axial connecting portion 501.

On the second edge portion 500 a sealing element 51 is arranged, which with sealing lips 510 protruding radially inwards (see in particular FIG. 7) is in sealing contact with a collar 63 of the drive gear 6 axially protruding from the rotational body 60 of the drive gear 6 and thus seals a transition to the drive gear 6 in a moisture-tight way also when the drive gear 6 is rotated about the axis of rotation D.

Figure 8:
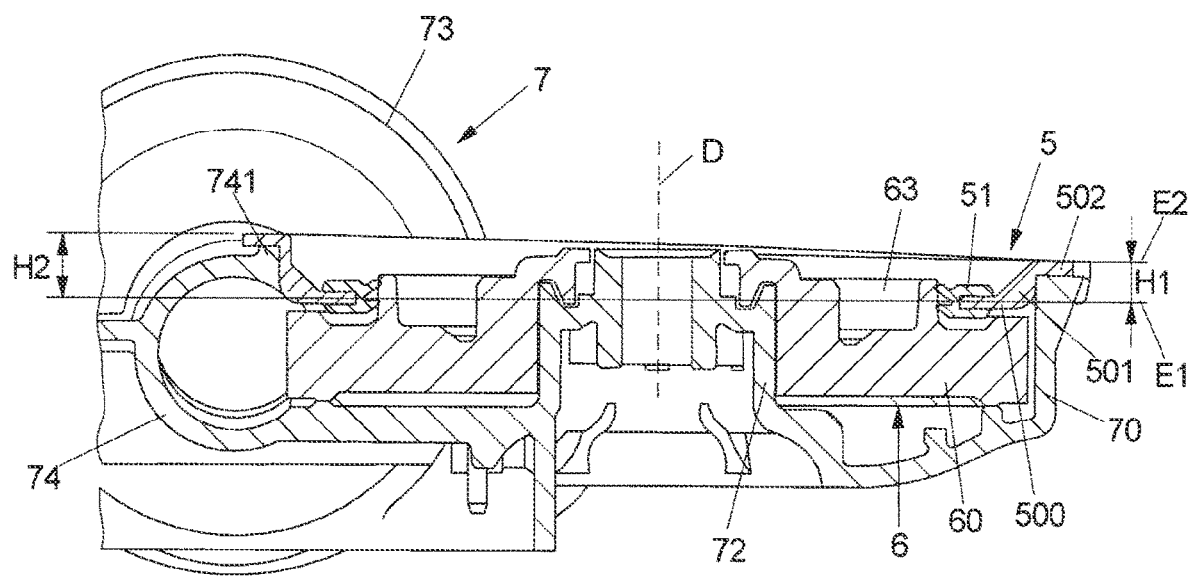
FIG. 8 shows frontal view of the arrangement of FIG. 6.
Figure 9:
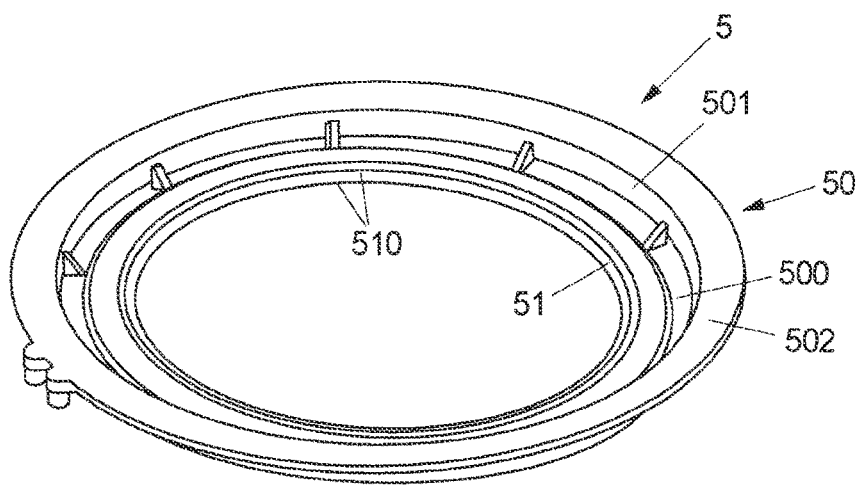
FIG. 9 shows a separate view of the gear cover.

In the exemplary embodiment of FIGS. 3 to 9, the second edge portion 500 of the gear cover 5 extends annularly along a plane E1 which is directed perpendicularly to the axis of rotation D and thus is aligned parallel to the drive gear 6, as this is shown in FIG. 8. The first edge portion 502 on the other hand extends annularly along a plane E2 which is positioned obliquely relative to the axis of rotation D, which results in the fact that the height H1, H2 of the first edge portion 502 relative to the second edge portion 500 varies circumferentially about the axis of rotation D, measured axially along the axis of rotation D.

As an example, the height H1, H2 between the first edge portion 502 and the second edge portion 500 in an area of the gear cover 5 facing away from the worm housing 74 is smaller than in the area of the gear cover 5, in which the gear cover 5 is connected to the worm housing 74 (height H2 in FIG. 8). This allows to provide a material thickening 741 in the area of the worm housing 74, which allows to produce a welding connection, such as by means of laser welding or ultrasonic welding, also in the area of the worm housing 74.

In such an area in which the connection of the gear cover 5 with the drive housing 7 requires a comparatively large axial installation space, namely in the area of the worm housing 74, the gear cover 5 thus has a comparatively large axial height H2 (see FIG. 8). In other areas, in which such an axial height H2 is not required and the gear cover 5 correspondingly can be formed with a smaller axial height H1 (see FIG. 8), the axial installation space of the gear cover 5 is reduced by comparison, which allows to reduce the axial installation space of the drive housing 7 as a whole.

As is shown in FIG. 17, this also allows to provide more space on the side of the carrier element 4 facing away from the drive housing 7 in an area A in which a power transmission means in the form of a traction cable 10 extends from the cable drum 3, so that the installation space for the traction cable 10 is not cramped. In the area A, the axial installation space on the side of the carrier element 4 facing away from the drive housing 7 is increased due to the reduced axial height H1 of the gear cover 5 in this area and as a result of the drive housing 7. In an area B, on the other hand, the axial installation space on the side of the carrier element 4 facing away from the drive housing 7 is smaller due to the reduced axial height H2 of the gear cover 5 in this area and as a result of the drive housing 7. Because in operation the traction cable 10 axially moves on the cable drum 3 due to being wound up and unwound, the installation space can thus be increased for a movement of the traction cable 10 on the cable drum 3.

In the illustrated exemplary embodiment, the gear cover 5 is produced by means of two-component plastic injection molding so that the sealing element 51 is formed integrally with the cover body 50 by means of injection molding. The sealing element 51 with its sealing lips 510 protrudes radially inwards from the second, radially inner edge portion 500 of the gear cover 5 annular in its basic shape.

Alternatively, the sealing element 51 can also be formed as an element separate from the cover body 50 of the gear cover 5 and for example be positively connected to the cover body 50.

Figure 3:
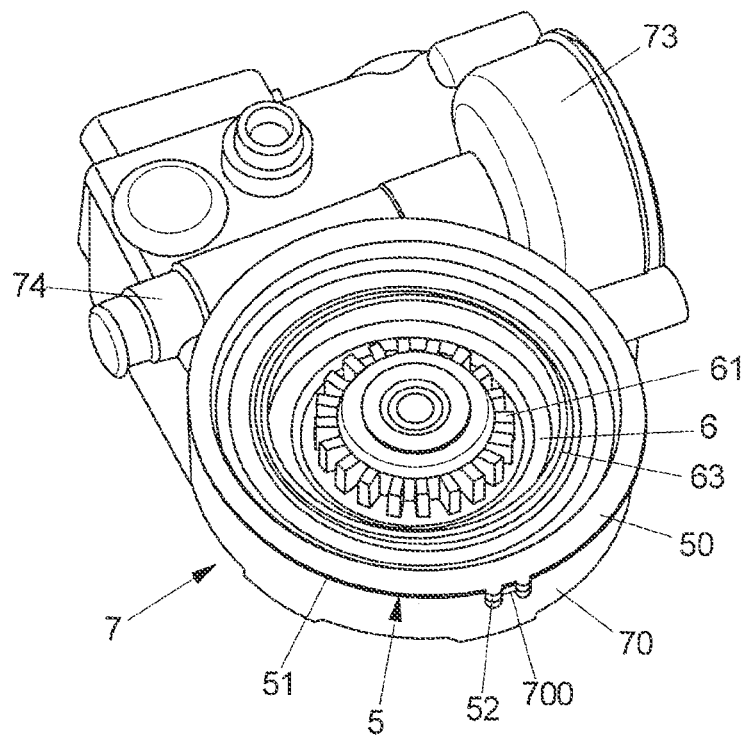
FIG. 3 shows a view of an exemplary embodiment of a drive housing with a drive gear rotatably accommodated thereon and a gear cover.
Figure 4:
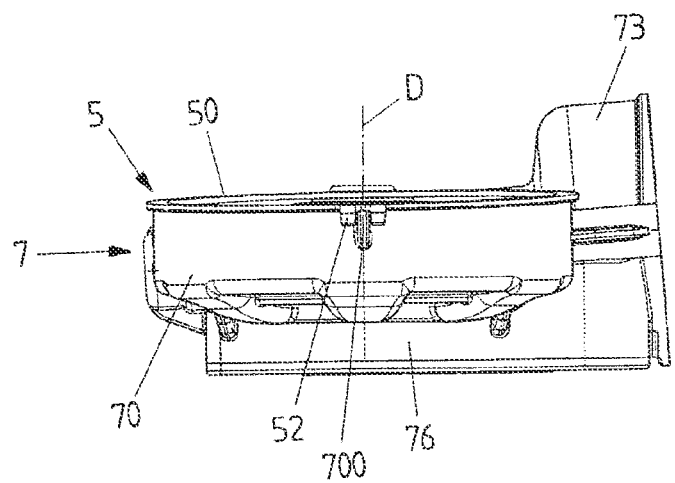
FIG. 4 shows another view of the drive housing of FIG. 3.
Figure 5:
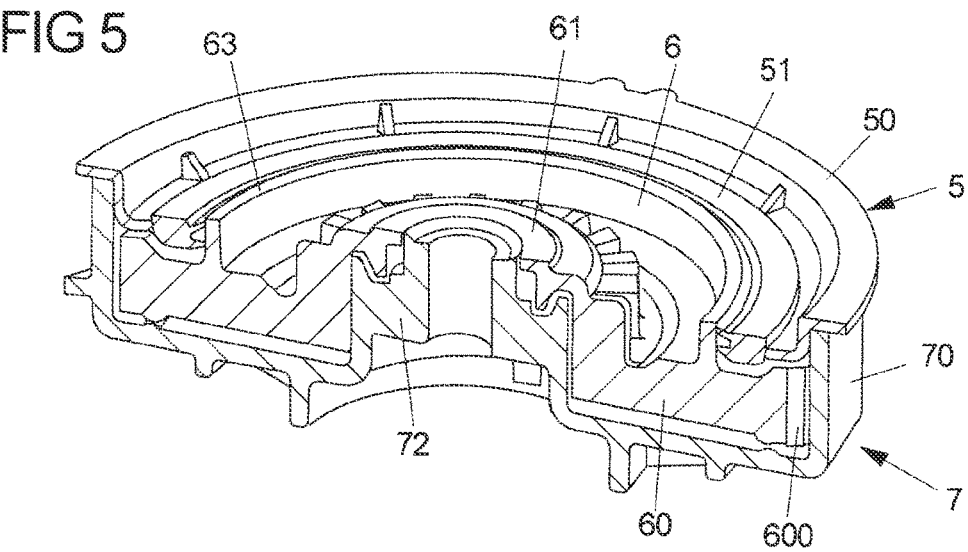
FIG. 5 shows a partly sectional view of the drive housing with the drive gear enclosed therein and the gear cover.
Figure 6:
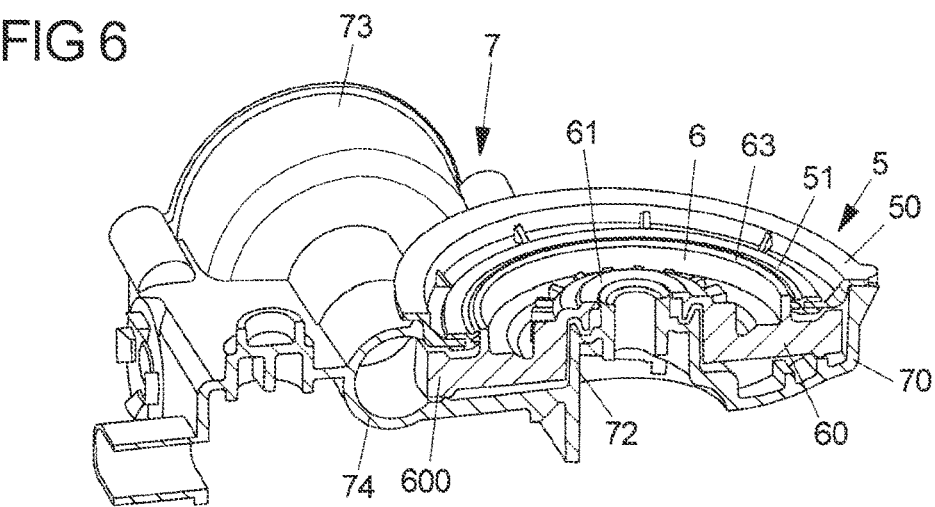
FIG. 6 shows another view of the exemplary embodiment of FIG. 5.
Figure 7:
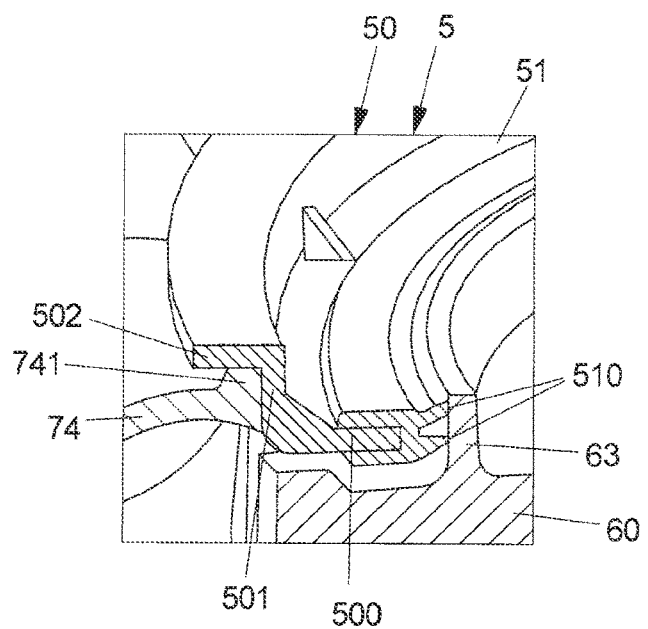
FIG. 7 shows a sectionally enlarged representation of the view of FIG. 6.

At the first, upper edge portion 502 of the cover body 50 the gear cover 5 has a alignment member 52 in the form of radial protrusions which, when the gear cover 5 is connected to the drive housing 7, is in engagement with a form-fit element 700 on the outside of the housing pot 70, as is shown in particular in FIGS. 3 and 4. Via this alignment member 52 in cooperation with the form-fit element 700 it is effected that the gear cover 5 can be properly attached to the drive housing 7 only in exactly one position, which facilitates the assembly of the drive housing 7 and the drive device 1.

Figure 10:
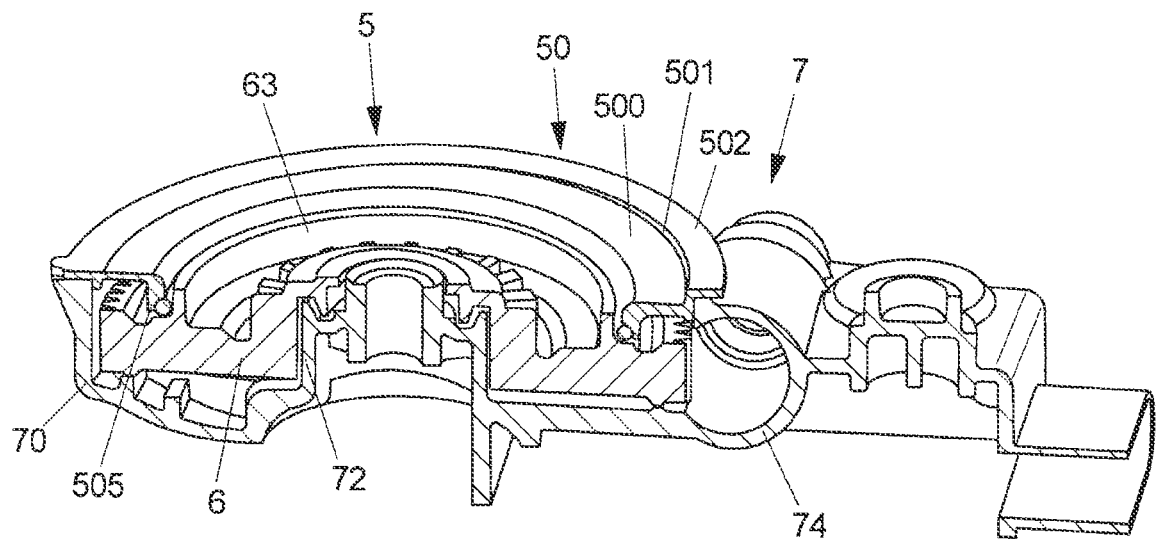
FIG. 10 shows a cut-free view of another exemplary embodiment of gear cover on a housing pot of a drive housing of a drive device.
Figure 11:
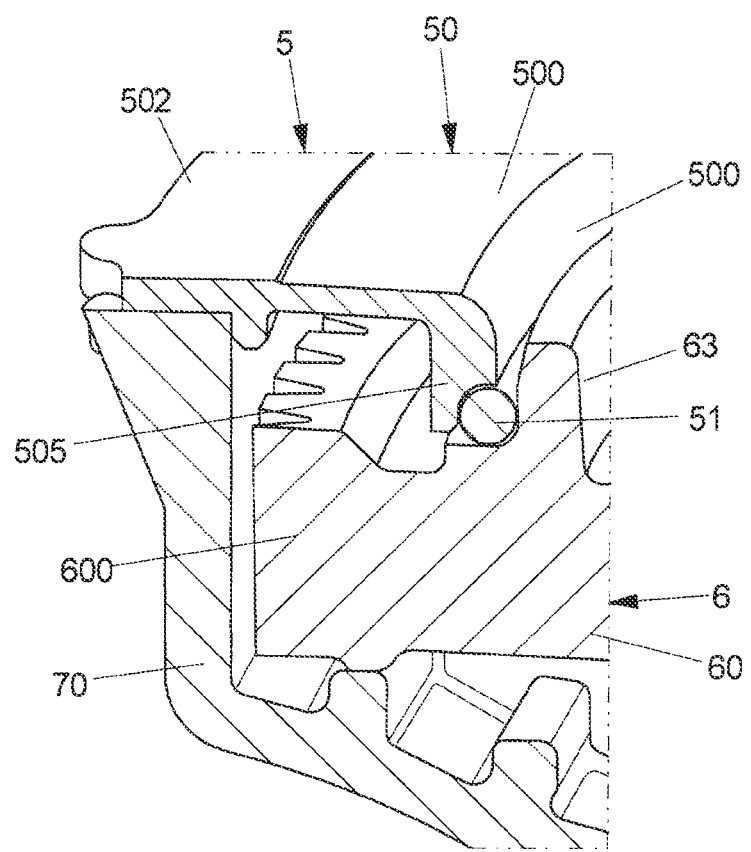
FIG. 11 shows a sectionally enlarged representation of the view of FIG. 10.
Figure 12:
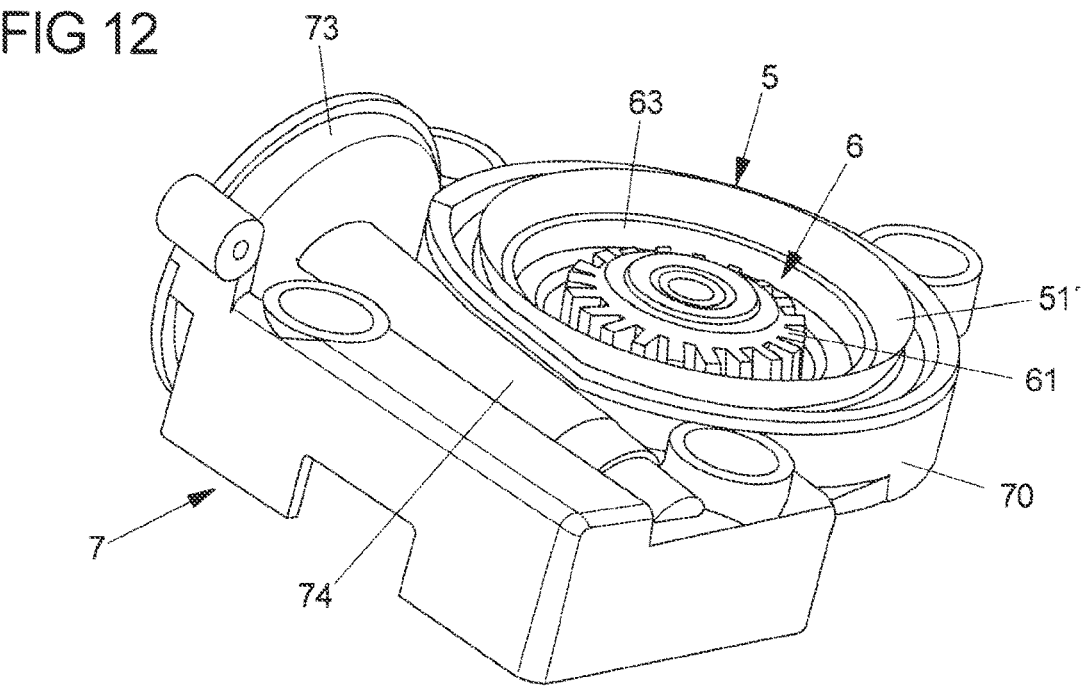
FIG. 12 shows a view again of another exemplary embodiment of gear cover on a housing pot of a drive housing of a drive device.
Figure 13:
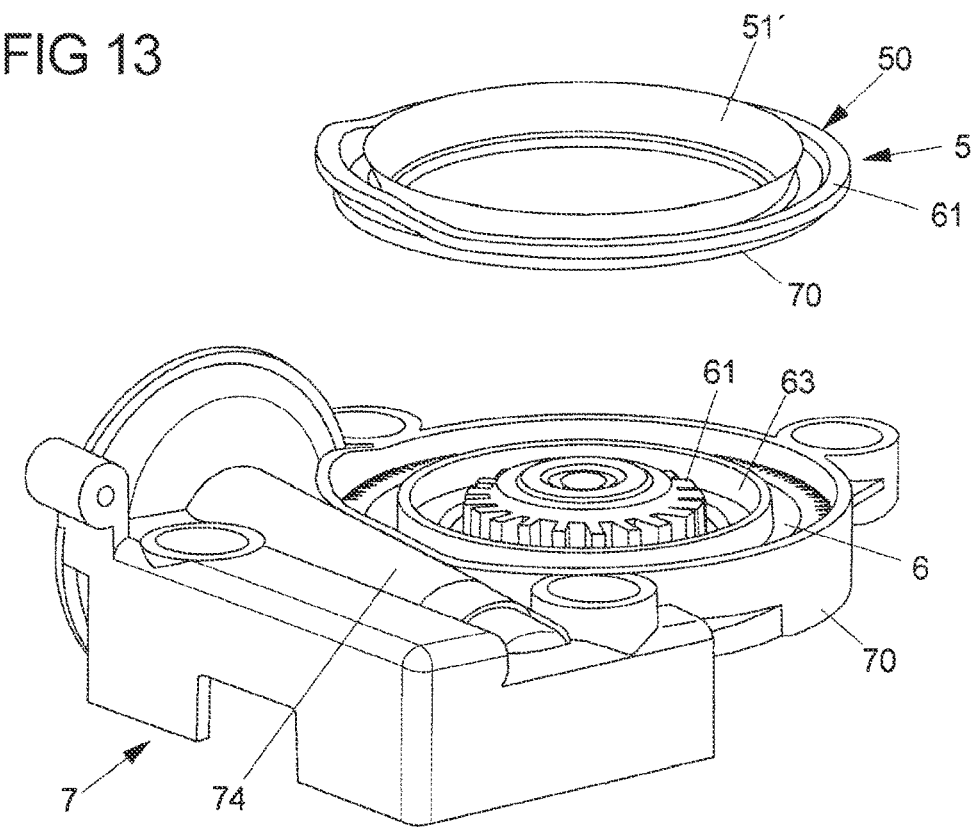
FIG. 13 shows a view of the exemplary embodiment of FIG. 12, with the gear cover separated from the drive housing.
Figure 14:
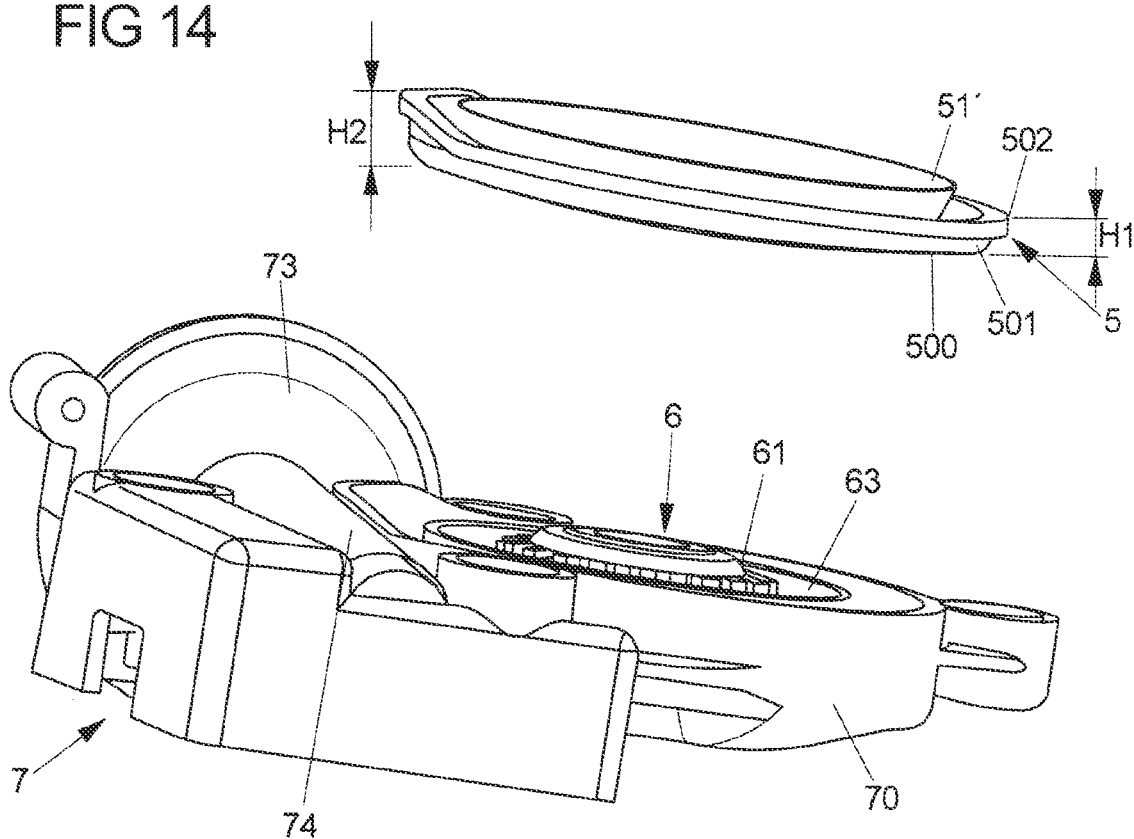
FIG. 14 shows another view of the arrangement of FIG. 13.
Figure 15:
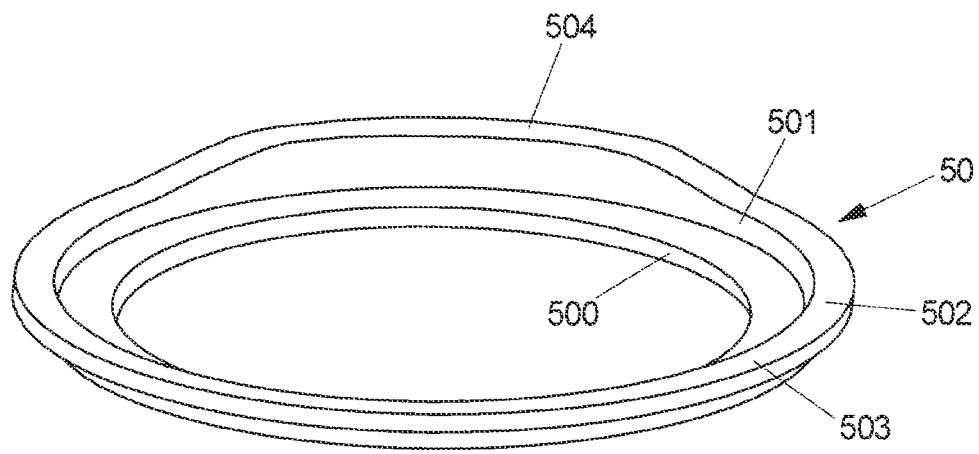
FIG. 15 shows a separate view of the gear cover of the exemplary embodiment of FIGS. 12 to 14.

In an exemplary embodiment shown in FIGS. 10 and 11, the sealing element 51 is formed as an element separate from the cover body 50 of the gear cover 5 and in this case attached as an O-ring to a chamfered portion 505 axially protruding from the second edge portion 500. The sealing element 51 in turn is in contact with the collar 63 axially protruding from the rotational body 60 of the drive gear 6 and thus creates a moisture-tight transition to the drive gear 6.

Otherwise, the exemplary embodiment of FIGS. 10 and 11 is functionally identical with the exemplary embodiment of FIGS. 3 to 9, so that reference also is made to the preceding explanations.

In an exemplary embodiment shown in FIGS. 12 to 16, the first edge portion 502 of the cover body 50 of the gear cover 5 includes different sections 503, 504 which each extend parallel to the radially inner, second edge portion 500 and thus are directed parallel to the drive gear 6. The different sections 503, 504 here are located, as shown in particular in FIGS. 14 and 15, at different heights H1, H2, wherein an axially higher section 504 of the first edge portion 502 is associated to the worm housing 74 and is connected to the worm housing 74. The gear cover 5 thus is axially raised only where an elevation is required due to the connection to the worm housing 74. In other areas, the first edge portion 502 has a reduced axial height H1 and extends parallel to the drive gear 6 and parallel to the radially inner, second edge portion 500 and thus directed perpendicularly to the axis of rotation D.

In the exemplary embodiment of FIGS. 12 to 16, two sealing elements 51, 51' are arranged on the gear cover 5. A first sealing element 51 here serves for sealing against the drive gear 6 and is connected to the radially inner, second edge portion 500 in such a way that the sealing element 51 axially protrudes from the radially inner, second edge portion 500 in the direction of the drive gear 6, as this is shown in particular in the sectional view of FIG. 16. Via this sealing element 51, a transition to the drive gear 6 thus is sealed in a moisture-tight way.

Figure 16:
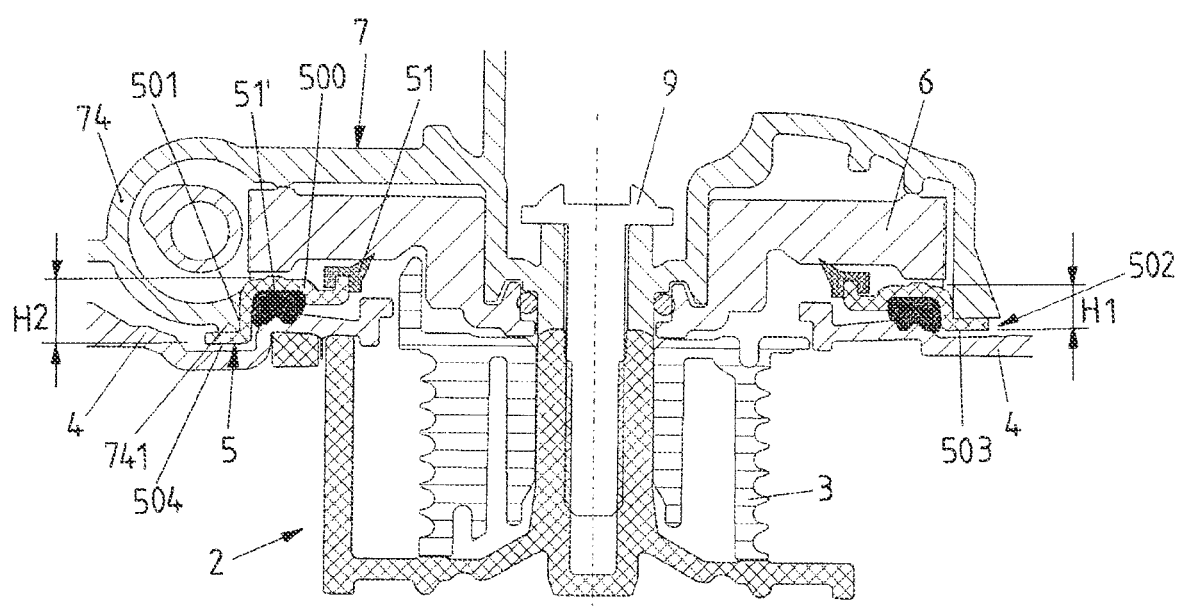
FIG. 16 shows a sectional view of the drive device of the exemplary embodiment of FIGS. 12 to 15.

A second sealing element 51' on the other hand serves for the moisture-tight sealing between the gear cover 5 and the carrier element 4 to which the drive housing 7 is attached, as this is shown in FIG. 16. The sealing element 51' is arranged on the radially inner edge portion 500 and—on a side facing away from the drive gear 6—points from the inner edge portion 500 towards the carrier element 4.

Both sealing elements 51, 51' for example are integrally molded to the gear cover 5 by means of two-component plastic injection molding, but can also be attached to the gear cover 5 as separately fabricated elements. Both sealing elements 51, 51' may be fabricated from a soft material, such as an elastomeric plastic.

In all exemplary embodiments of the gear cover 5, as described above with reference to FIGS. 3 to 17, the mode of operation of the drive device 1 can be identical in principle, so that with regard to the mode of operation of the drive device 1 reference is made to the explanations on FIGS. 1A, 1B and 2.

The idea underlying the invention is not limited to the exemplary embodiments described above.

The described drive device is not limited to the use in window lifter devices. The invention can be used in entirely different embodiments with entirely different drives for adjusting a vehicle part, for example a sliding roof or also a seat part or the like.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

| List of reference numerals | |
|---|---|
| 1 | drive device |
| 10 | power transmission element (traction cable) |
| 11 | guide rail |
| 110, 111 | deflection |
| 12 | carrier |
| 13 | window pane |
| 2 | cable outlet housing |
| 20 | bottom |
| 21 | housing portion |
| 22 | bearing element (bearing mandrel) |
| 221 | opening |
| 3 | output element (cable drum) |
| 30 | body |
| 300 | cable groove |
| 31 | internal gear |
| 310 | toothing |
| 4 | carrier element (assembly carrier) |
| 40 | surface portion |
| 41 | opening |
| 44 | recess |
| 440 | recess |
| 5 | gear cover |
| 50 | cover body |
| 500 | inner edge portion |
| 501 | raised portion |
| 502 | outer edge portion |
| 503, 504 | section |
| 505 | chamfered portion |
| 51, 51' | sealing element |
| 510 | sealing lips |
| 52 | alignment member |
| 6 | drive gear |
| 60 | rotational body |
| 600 | external toothing |
| 61 | connecting gear |
| 610 | toothing |
| 62 | opening |
| 63 | collar |
| 7 | drive housing |
| 70 | housing pot |

-continued

| List of reference numerals | |
|---|---|
| 700 | form-fit element |
| 72 | bearing element (bearing dome) |
| 720 | opening |
| 721 | engagement opening |
| 73 | motor pot |
| 74 | worm housing |
| 741 | material thickening |
| 75 | housing cover |
| 76 | electronics housing |
| 760 | circuit board |
| 761 | housing plate |
| 762 | connector |
| 8 | motor unit |
| 80 | electric motor |
| 800 | drive shaft |
| 81 | drive worm |
| 9 | fastening element |
| A, B | point |
| D | axis of rotation |
| E1, E2 | plane |
| H1, H2 | height |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive device for use in an adjusting apparatus configured to adjust a vehicle part, the drive device comprising:
a drive housing including a housing pot;
a drive gear disposed in the housing pot and rotatable about an axis of rotation;
an output element operatively connected to the drive gear; and
a gear cover connected to the housing pot and annularly extending about the axis of rotation, wherein the gear cover including a cover body provided with a first edge portion connected to the housing pot and a second edge portion protruding radially inwards relative to the first edge portion, wherein a height measured axially between the first edge portion and the second edge portion varies with respect a circumferential direction about the axis of rotation,
wherein the first edge portion extends flatly along a plane directed obliquely to the axis of rotation.

2. The drive device of claim 1, wherein the second edge portion extends along a plane directed perpendicularly to the axis of rotation.

3. The drive device of claim 1, wherein the first edge portion includes a first section and a second section, wherein the first section is spaced apart from the second edge portion by a first height and the second section is spaced apart from the second edge portion by a second height, wherein the second height is greater than the first height.

4. The drive device of claim 1, wherein the first edge portion of the gear cover is circumferentially connected to the drive housing.

5. The drive device of claim 1, wherein the gear cover includes a sealing element disposed on the cover body and configured to seal a transition to the drive gear.

6. The drive device of claim 5, wherein the sealing element is connected to the second edge portion.

7. The drive device of claim 5, wherein the sealing element is integrally connected to the cover body by means of two-component plastic injection molding or the sealing element is fabricated as a separate element attached to the cover body.

8. The drive device of claim 5, wherein the drive gear includes a rotational body and a collar axially protruding from the rotational body along the axis of rotation, wherein the sealing element sealingly cooperates with the collar.

9. The drive device of claim 1, further comprising:
a motor unit including an electric motor and a drive shaft configured to be driven by the electric motor.

10. The drive device of claim 9, wherein the drive shaft includes a drive worm provided with a worm toothing.

11. The drive device of claim 9, wherein the drive gear is operatively connected to the drive shaft and configured to be driven by the drive shaft.

12. The drive device of claim 11, wherein the output element is a cable drum configured to move a traction cable connected to the vehicle part.

13. An assembly comprising:
a drive device including,
a drive housing including a housing pot;
a drive gear disposed in the housing pot and rotatable about an axis of rotation;
an output element operatively connected to the drive gear; and
a gear cover connected to the housing pot and annularly extending about the axis of rotation, wherein the gear cover including a cover body provided with a first edge portion connected to the housing pot and a second edge portion protruding radially inwards relative to the first edge portion;
a motor pot; and
a carrier element connected to the drive device, wherein the drive housing and the drive gear are enclosed in the motor pot, and the gear cover, connected to the motor pot, is arranged on a first side of the carrier element and the output element is arranged on a second side of the carrier element,
wherein the first edge portion extends flatly along a plane directed obliquely to the axis of rotation.

14. The drive device of claim 4, wherein the first edge portion of the gear cover is welded to the drive housing.

15. A drive device configured to adjust a vehicle part, the drive device comprising:
a drive housing including a housing pot;
a drive gear disposed in the housing pot and rotatable about an axis of rotation; and
a gear cover having an annular shape and including a first edge portion, fixed to the housing pot, a second edge portion, and an axial connecting portion disposed therebetween, wherein a first portion of the first edge portion is spaced apart from the second edge portion by a first height and a second portion of the first edge portion is spaced apart from the second edge portion by a second height, wherein the second height is greater than the first height,
wherein the first edge portion extends flatly along a plane directed obliquely to the axis of rotation.

16. The drive device of claim 15, wherein the second portion of the first edge portion is formed by a tapered lip.

17. The drive device of claim 15, further comprising:
a sealing element integral with the second edge portion.

18. The drive device of claim 17, wherein the sealing element has a frustoconical shape.

19. The drive device of claim 17, wherein the drive gear includes a rotational body and a collar axially extending from the rotational body, wherein the collar and the sealing element collectively form a seal.

\* \* \* \* \*